United States Patent
O'Mant

[15] 3,691,202
[45] Sept. 12, 1972

[54] PHENYL-THIENYL- AND PHENYL-FURYL MALONIC ACID DERIVATIVES

[72] Inventor: Derrick Michael O'Mant, Macclesfield, England

[73] Assignee: Imperial Chemical Industries, Limited, London, England

[22] Filed: July 7, 1970

[21] Appl. No.: 53,005

Related U.S. Application Data

[62] Division of Ser. No. 812,358, April 1, 1969, abandoned.

[30] Foreign Application Priority Data

March 17, 1969 Great Britain..........17,895/69
Oct. 25, 1968 Great Britain..........50,788/68
Dec. 10, 1968 Great Britain..........58,666/69

[52] U.S. Cl..........260/332.2 A, 260/347.4, 424/275, 424/285
[51] Int. Cl.......A61k 27/00, C07d 63/12, C07d 5/16
[58] Field of Search.......260/332.2 A, 347.4, 475 SC

[56] References Cited

FOREIGN PATENTS OR APPLICATIONS 1,030,756  5/1966  Great Britain.............260/475
6,500,865  7/1965  Netherlands..............260/475

OTHER PUBLICATIONS

Randall, et al., J. Pharmacol. Exp. Therap., 93: 314 (1948).
Blicke, et al., Abstracts A.C.S. Meeting, April 1946, 54k.

Primary Examiner—Henry R. Jiles
Assistant Examiner—Cecilia M. Shurko
Attorney—Cushman, Darby & Cushman

[57] ABSTRACT

Phenyl-thienyl-malonic acid derivatives and phenyl-furyl-malonic acid derivatives, processes for their preparation, and pharmaceutical compositions comprising them. Compounds have anti-inflammatory, hypocholesterolaemic, analgesic and antipyretic activity. A representative compound is dimethyl $\alpha$-(5-p-chlorophenyl-thien-2-yl)-$\alpha$-methylmalonate.

4 Claims, No Drawings

PHENYL-THIENYL- AND PHENYL-FURYL MALONIC ACID DERIVATIVES

This application is a divisional application of United States Patent application Ser. No. 812,358 filed April 1, 1969, now abandoned.

This invention relates to new heterocyclic compounds, and more particularly it relates to new thiophen and furan derivatives which have anti-inflammatory, hypocholesterolaemic, analgesic and antipyretic activity.

According to the invention there are provided heterocyclic compounds of the formula:

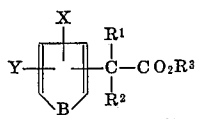

I wherein B stands for an oxygen or sulphur atom, X stands for hydrogen or a chlorine or bromine atom, Y stands for a phenyl radical optionally substituted by one or two fluorine, chlorine or bromine atom(s), $R^1$ stands for hydrogen or a methyl radical, $R^2$ stands for a $C_{2-6}$ alkoxycarbonyl, benzyloxycarbonyl or phenoxycarbonyl radical, and $R^3$ stands for a $C_{1-5}$ alkyl, benzyl or phenyl radical, and Y and $-CR^1R^2 \cdot CO_2R^3$ are linked to non-adjacent carbon atoms of the heterocyclic nucleus.

As stated above, in the compounds of this invention Y and $-CR^1R^2 \cdot CO_2R^3$ are linked to non-adjacent carbon atoms of the heterocyclic nucleus. It is to be understood that this situation obtains generally throughout this specification. Thus, in the heterocyclic compounds used as starting materials in the processes disclosed below Y and $-CR^1R^2 \cdot CO^2R^3$ (or groups corresponding to the latter) are linked to non-adjacent carbon atoms of the heterocyclic nucleus.

Compounds wherein Y contains one or two halogeno substituent(s), as described above, constitute a preferred embodiment of the invention because, generally speaking, they are more active than the corresponding unsubstituted phenyl derivatives.

As a suitable value for $R^2$ there may be mentioned, for example, a methoxycarbonyl, ethoxycarbonyl, benzyloxycarbonyl or phenoxycarbonyl radical. As a suitable valve for Rhu 3 there may be mentioned a methyl, ethyl, propyl, butyl, benzyl or phenyl radical.

Preferred compounds of the invention are dimethyl α-(5-p-chlorophenylthien-2-yl)-α-methylmalonate and dimethyl α-(5-p-chloro-phenylfur-2yl)α-methylmalonate.

The said compounds of formula I may be obtained by reacting sodium or potassium or a hydride, amide or $C_{1-}$ alkoxide thereof, with a carbonate of the formula $CO \cdot (OR^3)B2$, wherein $R^3$ has the meaning stated above, and a compound of the formula:

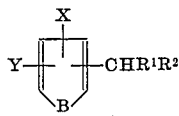

II wherein B, X, Y, $R^1$ and $R^{2\,2}$ have the meanings stated above. The reaction may be carried out in an excess of the carbonate used as reactant, and it may be accelerated or completed by the application of heat.

Those of the said compounds of formula I wherein $R^1$ stands for a methyl radical may be obtained by reacting an alkali metal derivative of a compound of the formula:

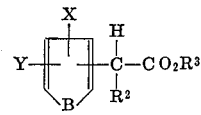

III wherein B, X, Y, $R^2$ and $R^3$ have the meanings stated above, with methyl chloride, bromide or iodide. This process is conveniently carried out in an organic solvent, for example dimethyl sulphoxide or dioxan.

Those of the said compounds of formula I wherein X stands for a chlorine or bromine atom may be obtained by reacting the corresponding compound wherein X stands for hydrogen, in the presence of an alkali metal acetate, with a solution of chlorine or bromine in an organic solvent, for example acetic acid.

Those of the said compounds of formula I wherein $R^2$ stands for a $C_{4-6}$ alkoxycarbonyl, benzyloxycarbonyl or phenoxycarbonyl radical, and $R^3$ stands for a $C_{3-5}$ alkyl, benzyl or phenyl radical, may be obtained by reacting the corresponding methyl or ethyl ester wherein $R^2$ stands for a methoxycarbonyl or ethoxycarbonyl radical and $R^3$ stands for a methyl or ethyl radical, with a $C_{3-5}$ alkanol, benzyl alcohol or phenol, in the presence of dibutyl tin dilaurate at a temperature in the range 25° to 200°C. The reaction may optionally be carried out in the presence of an aromatic hydrocarbon solvent, for example toluene.

It is to be understood that the starting materials used in all the above processes are obtainable by methods known per se.

According to a further feature of the invention there are provided pharmaceutical compositions comprising a heterocyclic compound of the formula I, wherein B, X, Y, $R^1$, $R^2$ and $R^3$ have the meanings stated above, and a non-toxic pharmaceutically-acceptable diluent or carrier.

The pharmaceutical compositions may, for example, be in the form of tablets, pills, capsules, suppositories, non-sterile aqueous or non-aqueous solutions or suspensions, sterile injectable aqueous or non-aqueous solutions or suspensions, creams, lotions or ointments. These compositions may be obtained in conventional manner using conventional excipients. The compositions may optionally contain, in addition to at least one of the heterocyclic compounds which characterize this invention, at least one known agent having anti-inflammatory and/or analgesic activity, for example aspirin, paracetamol, codeine, chloroquine, phenylbutazone, oxyphenbutazone, indomethacin, mefenamic acid, flufenamic acid, ibufenac, or an anti-inflammatory steroid, for example prednisolone. Those compositions intended for oral administration may, in addition, optionally contain at least one anti-cholinergic agent, for example homatropine methyl bromide, and/or an antacid, for example aluminum hydroxide; and/or a uricosuric agent, for example probenecid. Those compositions designed for tropical application may, in addition, optionally contain a vasodilating agent, for example tolazoline, or a vasoconstricting agent, for example adrenaline; a local anaesthetic, for example amethocaine, or a counter-irritant, for example capsicum; and/or at least one agent chosen from the following classes: antibacterial agents, which include sulphonamides and antibiotics having antibacterial action, for example neomycin; antifungal agents, for example hydroxyquinoline; anti-histaminic agents, for example promethazine; and rubefacient agents, for example methyl nicotinate.

The compounds of the invention are active in a test (Adjuvant induced arthritis in rats; Newbould, Brit. J. Pharmacol, Chemotherap., 1963, 21, 127–136) which is standard in the art for testing for anti-inflammatory activity. It is well known and accepted in the art that non-steroidal anti-inflammatory compounds exhibit analgesic and antipyretic activity. Accordingly, as the compounds of the invention are non-steroidal anti-inflammatory compounds, it is reasonable to conclude that they possess analgesic and antipyretic activity.

The compounds of the invention are useful in the treatment of warm-blooded animals (including mammals) and for this purpose we recommend that one of said compounds be administered orally as a suitable dosage unit form, for example a tablet or capsule, and that the daily dosage be in the range 0.75 to 15 mg. per kg. of host. In particular, when one of said compounds is used for the treatment of man we recommend that it be administered orally as a suitable dosage unit form, for example a tablet or capsule, at a total daily dose of 50 to 1,000 mg. of said compound per 70 kg. man.

The invention is illustrated by the following examples:

EXAMPLE 1

Methyl $\alpha$-5-p-chlorophenylthien-2-yl) acetate [10 g.; m.p 78°–80°C.] was heated under reflux with sodium hydride (3 g. ; washed free from mineral oil with petroleum ether of b.p. 60°–80°C.) and dimethyl carbonate (150 ml. ) for 3 hours. The mixture was cooled, poured into an ice-water mixture (800 ml.), and extracted with ether (4 × 200 ml.). The combined extracts were washed with water (2 × 100 ml.), dried (anhydrous sodium sulphate), and the solvent evaporated. The residue was crystallized from methanol to give dimethyl $\alpha$-(5-p-chlorophenylthien-2-yl)malonate, m.p. 74–75°C.

EXAMPLE 2

Dimethyl $\alpha$-(5-p-chlorophenylthien-2-yl)malonate (2.2 g. ) was dissolved in dry dimethylsulphoxide (40 mol.). A dispersion of sodium hydride (0.2 g.) in mineral oil (0.2 ml.) was added, and the mixture was stirred for 1 hour. Methyl iodide (4 ml.) was added to the resulting pale yellow solution and, after it has been stirred overnight, the mixture was poured into an ice-water mixture (400 ml.). The precipitated solid was separated by filtration and purified by chromatography on a column of magnesium silicate (1 inch diameter × 12 inches long) which was eluted with benzene in 25 ml. portions. Fractions Nos. 7–28 were combined, and the solvent evaporated. The residue was crystallized from methanol to give dimethyl $\alpha$-(5-p-chlorophenylthien-2-yl)-$\alpha$-methylamalonate, m.p. 70°C.

EXAMPLE 3

Methyl 5-p-chlorophenylfur-2-ylacetate (2.8 g.) was refluxed with a suspension of sodium hydride (1.6 g.) in dimethyl carbonate (85 ml.) for 1 hour. After 17 hours at ambient temperature the mixture was poured into ice/water (350 ml.) and extracted with ether (3×100 ml.). The combined ethereal extracts were dried over anhydrous sodium sulphate and evaporated to dryness. The residual, low melting solid was crystallized from methanol, and there was thus obtained dimethyl $\alpha$-(5-p-chlorophenylfur-2-yl) malonate, m.p. 58–59°C.

EXAMPLE 4

Dimethyl $\alpha$-(5-p-chlorophenylfur-2-yl)malonate (1.2 g.) was added to a suspension of sodium hydride (1 g.) in dry dimethylsulphoxide (10 ml.). The mixture was stirred for 30 minutes, and methyl iodide (20 mol.) was then added. The mixture was stirred for a further 2 days, poured into ice/water (70 ml.) and extracted with ether (3×20 ml.). The combined ethereal extracts were washed with water (2×20 ml.), dried over anhydrous sodium sulphate, and evaporated in vacuo. The residual yellow oil solidified and was crystallized from methanol to give dimethyl$\alpha$-(5-p-chlorophenylfur-2yl)-$\alpha$-methylmalonate, m.p. 50-54°C.

EXAMPLE 5

Methyl 5-p-chlorophenylthien-2-ylacetate (2 g.) was refluxed in a mixture of benzyl alcohol (5 ml.), toluene (100 ml.) and dibutyl tin dilaurate (0.1 ml.). The vapors were passed up to 12 inch fractionating column packed with Dixon gauze rings and fitted with a variable take-off head. Methanol and toluene were slowly distilled for 4 hours. At the end of 4 hours only toluene distilled. The residue in the flask was passed down a Florisil column (12 inches long × 1 inch diameter) which was eluted with toluene. The eluate was evaporated, and the residue triturated with a small volume of ice-cold methanol, and gave crystals of benzyl 5-p-chlorophenylthien-2-ylacetate, m.p. 71°–72 °C.

By a similar procedure, substituting dimethyl $\alpha$-(5-p-chlorophenyl thien-2-yl)malonate for the above acetate, there was obtained dibenzyl $\alpha$-(5-p-chlorophenylthien-2-yl)malonate, m.p. 94°C.

EXAMPLE 6

A mixture of 50 parts of dimethyl$\alpha$-(5-p-chlorophenylthien-2-yl)-$\alpha$-methylmalonate and 300 parts of maize starch was granulated with a sufficient quantity of 10 percent w/v starch paste. The granules were passed through a 20-mesh screen and dried at a temperature not exceeding 50°C. The dried granules were blended with 4 parts of magnesium stearate and compressed into tablets which contained from 50 to 250 mg. of active ingredient. There were thus obtained tablets suitable for oral use for therapeutic purposes. Instead of the 50 parts of dimethyl $\alpha$-(5-p-chlorophenylthien-2-yl)-$\alpha$-methylmalonate there were used 50 parts of dimethyl $\alpha$-(5-p-chlorophenylfur-2-yl)-$\alpha$-methylmalonate and in a similar manner there were obtained tablets suitable for oral administration for therapeutic purposes.

What we claim is:

1. A heterocyclic compound of the formula:

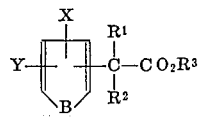

wherein B stands for an oxygen or sulphur atom, X stands for hydrogen or a chlorine or bromine atom, Y stands for a phenyl radical, optionally substituted by one or two fluorine, chlorine or bromine atom or atoms, $R^1$ stands for hydrogen or a methyl radical, $R^2$ stands for a $C_{2-6}$ alkoxycarbonyl, benzyloxycarbonyl or phenoxycarbonyl radical, and $R^3$ stands for a $C_{1-5}$ alkyl, benzyl or phenyl radical, and Y and $-CR^1R^2 \cdot CO_2R^3$ are are linked to non-adjacent carbon atoms of the heterocyclic nucleus.

2. A compound as claimed in claim 1 wherein X stands for hydrogen or a bromine atom, Y stands for a phenyl radical optionally substituted by a fluorine, chlorine or bromine atom $R^1$ stands for hydrogen or a methyl radical, $R^2$ stands for a $C_{2-6}$ alkoxycarbonyl or benzyloxycarbonyl radical, and $R^3$ stands for a $C_{1-5}$ alkyl or benzyl radical.

3. A compound as claimed in Claim 1 which is dimethyl α-(5-p-chlorophenylthien-2yl)-α-methylmalonate.

4. A compound as claimed in claim 1 which is dimethyl α- -(5-p-chlorophenylfur-2-yl)-α-methylmalonate.

* * * * *